US006488975B1

(12) United States Patent
Sethi et al.

(10) Patent No.: US 6,488,975 B1
(45) Date of Patent: Dec. 3, 2002

(54) COCOA POWDER FOR USE IN MULTI-LAYERED GEL-BASED DESSERT PRODUCTS AND METHOD FOR MAKING SAME

(75) Inventors: Virender Sethi, Anaheim, CA (US); Amy Lammert, Monrovia, CA (US); Mario Mikula, Mission Viejo, CA (US); Constantine Sandu, Tustin, CA (US)

(73) Assignee: Conagra Grocery Product Company, Irvine, CA (US)

( * ) Notice: Subject to any disclaimer, the term of this patent is extended or adjusted under 35 U.S.C. 154(b) by 0 days.

(21) Appl. No.: 09/669,260

(22) Filed: Sep. 25, 2000

(51) Int. Cl.[7] .............................. A23G 1/00; A23L 1/05; A23L 1/187; A23L 1/27
(52) U.S. Cl. ...................... 426/431; 426/573; 426/579; 426/593; 426/479; 426/489; 426/631; 426/582
(58) Field of Search ........................ 426/593, 93, 479, 426/489, 330.3, 330, 331, 100

(56) References Cited

U.S. PATENT DOCUMENTS

| | | | |
|---|---|---|---|
| 2,484,543 A | 10/1949 | Baldwin et al. ............ 99/139 |
| 2,533,221 A | 12/1950 | Cleland et al. ............ 99/148 |
| 2,651,576 A | 9/1953 | Longenecker et al. ...... 99/148 |
| 2,835,592 A * | 5/1958 | Rusoff ...................... 426/42 |
| 2,841,499 A | 7/1958 | Grossi ....................... 99/148 |
| 2,932,572 A | 4/1960 | Sarich ........................ 99/3 |
| 2,957,769 A * | 10/1960 | Rusoff ...................... 426/254 |
| 3,111,411 A | 11/1963 | Livingston ................. 99/148 |
| 3,249,444 A | 5/1966 | Bollenback et al ......... 99/148 |
| 3,336,141 A | 8/1967 | Frisina ....................... 99/148 |
| 3,579,355 A | 5/1971 | Wyss et al. ................. 99/130 |
| 3,582,358 A | 6/1971 | Bundus ...................... 99/128 |
| 3,615,591 A | 10/1971 | Newlin et al. ............. 99/128 |
| 3,615,592 A | 10/1971 | Peterson .................... 99/134 |
| 3,615,659 A * | 10/1971 | Weber ....................... 426/402 |
| 3,618,588 A | 11/1971 | Answar et al. ............. 127/34 |
| 3,702,254 A | 11/1972 | Cassanelli et al. .......... 99/139 |
| 3,734,745 A | 5/1973 | Cassanelli et al. .......... 99/130 |
| 3,860,728 A | 1/1975 | Tanner et al. .............. 426/105 |
| 3,924,016 A | 12/1975 | Walters et al. ............. 426/510 |
| 3,937,851 A | 2/1976 | Bellanca et al. ........... 426/540 |
| 3,969,514 A | 7/1976 | Tiemstra ................... 426/90 |
| 3,969,536 A | 7/1976 | Ikeda et al. ................ 426/103 |
| 4,078,093 A * | 3/1978 | Girsh ........................ 424/48 |
| 4,113,505 A | 9/1978 | Bellanca et al. ........... 106/137 |
| 4,138,271 A | 2/1979 | Ohira et al. ................ 127/34 |
| 4,167,422 A | 9/1979 | Bellanca et al. ........... 106/289 |
| 4,235,939 A * | 11/1980 | Kimberly, Sr. ............. 426/549 |
| 4,304,792 A | 12/1981 | Sreenivasan et al. ....... 426/250 |
| 4,316,917 A | 2/1982 | Antoshikw et al. ........ 426/540 |
| 4,325,743 A | 4/1982 | Tibbetts et al. ............ 124/46.2 |
| 4,414,234 A | 11/1983 | Screenivasan et al. ..... 426/510 |
| 4,444,798 A * | 4/1984 | Magnolato et al. ........ 426/422 |
| 4,560,564 A | 12/1985 | Bruno, Jr. et al. ......... 426/250 |
| 4,568,553 A | 2/1986 | Murray et al. ............. 426/548 |
| 4,614,662 A | 9/1986 | Ramaswamy ............... 426/510 |
| 4,704,292 A * | 11/1987 | Kattenberg ................. 426/565 |
| 4,717,571 A | 1/1988 | Okonogi et al. ............ 426/104 |
| 4,744,991 A | 5/1988 | Serpelloni .................. 426/5 |
| 4,753,766 A | 6/1988 | Pinsolle ..................... 264/171 |
| 4,758,444 A * | 7/1988 | Terauchi et al. ............ 426/593 |
| 4,759,936 A | 7/1988 | Best et al. .................. 426/250 |
| 4,869,917 A | 9/1989 | Cunningham et al. ...... 426/576 |
| 4,871,562 A * | 10/1989 | Terauchi et al. ........... 426/330.3 |
| 4,915,971 A | 4/1990 | Fennema et al. ........... 426/578 |
| 4,948,600 A * | 8/1990 | Zumbe et al. .............. 426/45 |
| 5,002,779 A * | 3/1991 | Mehansho et al. ......... 426/593 |
| 5,019,405 A | 5/1991 | Sapers ....................... 426/250 |
| 5,114,492 A | 5/1992 | Wolf et al. ................. 127/42 |
| 5,151,293 A | 9/1992 | Vassiliou ................... 426/614 |
| 5,171,602 A | 12/1992 | Singer et al. .............. 426/572 |
| 5,192,566 A | 3/1993 | Cox et al. .................. 428/89 |
| 5,202,137 A | 4/1993 | Duffy et a. ................. 426/89 |
| 5,227,189 A | 7/1993 | Vassiliou ................... 426/614 |
| 5,338,554 A * | 8/1994 | Vogt et al. ................. 426/429 |
| 5,387,427 A | 2/1995 | Lawrence et al. .......... 426/573 |
| 5,389,394 A * | 2/1995 | Weyersbach et al. ....... 426/593 |
| 5,417,990 A | 5/1995 | Soedjak et al. ............. 426/89 |
| 5,633,031 A | 5/1997 | Zablocki et al. ........... 426/590 |
| 5,670,344 A * | 9/1997 | Mehansho et al. ......... 426/593 |
| 6,090,427 A * | 7/2000 | Mazurek et al. ........... 426/386 |
| 6,203,831 B1 * | 3/2001 | Eder et al. ................. 426/100 |
| 6,235,320 B1 | 5/2001 | Daravingus et al. ........ 426/34 |

OTHER PUBLICATIONS

Food Product Design, "Acid–Stable Natural Colors Offer Opportunities for Formulators", Jun. 1998, p. 145.

Food Technology; Product & Technologies—Ingredients; Natural Colors: Pigments of Imagination—Jun. 1998, vol. 52, No. 6, pp. 70–82.

Kuntz, L.A., Ed., Food Product Design, Mar. 1998; Applications: Colors Au Naturel; pp. 60–74.

Warner–Jenkinson, Brochure: What is Beta Carotene?; 3 sheets.

Williamson, D.D., "The Basics of Caramel Colors", copyright 1998; pp. 1–9.

Williamson, D.D., "Caramel Color, A Love Story"; 1998, D.D. Williamson & Co., Inc., pp. 1–20.

(List continued on next page.)

Primary Examiner—Carolyn Paden
(74) Attorney, Agent, or Firm—Christie, Parker & Hale, LLP

(57) ABSTRACT

Disclosed is a modified cocoa powder prepared by extracting a cocoa powder containing water-soluble solids with water to remove a substantial portion of the water-soluble solids. Generally, the extraction level is from about 5 to about 60. The resulting, water-extracted cocoa powder is useful in preparing multi-layered, gel-based dessert products, such as puddings, having a first gel-based layer and an adjacent second gel-based layer, at least one of the layers containing the water-extracted cocoa powder.

75 Claims, No Drawings

OTHER PUBLICATIONS

Hashisaka, A., et al., "Method forReducing Color Migration in Multi–Layered and Colored Gel–Based Dessert Products and the Products so produced", Copy of U.S. Patent Application No. 09/296,694; Filed Apr. 21, 1999, (Docket No. C944:43603), 12 pages.

Copy of Amendment filed Aug. 30, 2001, in response to Office action dated May 29, 2001, Hashisaka, A., et al., "Method for Reducing Color Migration in Multi–Layered and Colored Gel–Based Dessert Products and the Products so Produced", U.S. Patent Application No. 09/296694; File Apr. 21, 1999; (Docket No. C944:43603), 6 Pages.

Copy of Preliminary Amendment filed Apr. 3, 2001, Hashisaka, A., et al., "Method for Reducing Color Migration in Multi–Layered and Colored Gel–Based Dessert Products and the Products so Produced", U.S. Patent Application No. 09/296,694; Filed Apr. 21, 1999; (Docket No. C944;43603) 7 pages.

Copy of Response After Final filed Nov. 13, 2000, in response to Office action dated Sep. 12, 2000, Hashisaka, A., et al., "Method for Reducing Color Migration in Multi–Layered and Colored Gel–Based Dessert Products and the Products so Produced", U.S. Patent Application No. 09/296,694; Filed Apr. 21, 1999; (Docket No. C944:43603), 6 pages.

Copy of Amendment filed Jun. 16, 2000, in response to Office action dated Feb. 16, 2000, Hashisaka, A., et al., "Method for Reducing Color Mirgation in Multi–Layered and Colored Gel–Based Dessert Products and the Products so produced", U.S. Patent Application No. 09/296,694; filed Apr. 21, 1999; (Docket No. C944:43603), 6 pages.

Hashisaka, A., et al., "Method for Reduing Color Migration in Multi–Layered, Carmel Colored, Gel–Based Dessert Products and the Products soProduced", Copy of U.S. Patent Application No. 09/296706; Filed Apr. 21, 1999, (Docket No. C944:3604), 13 pages.

Copy of Second Amendment After Final Action filed May 1, 2001, in response to final Office action date Nov. 7, 2000 and Advisory Action dated Apr. 19, 2001, Hashisaka, a., et al., "Method for Reducing Color Migration in Multi–Layered, Caramel Colored, Gel–Based Dessert Products and the Products so Produced", U.S. Patent Application No. 09/296,706; Filed Apr. 21, 1999; (Docket No. C944:3604), 6 pages.

Copy of Amendment After Final Action filed Apr. 9, in response to final Office action date Nov. 7, 2000 , Hashisaka, a., et al., "Method for Reducing Color Migration in Multi- –Layered, Caramel Colored, Gel–Based Dessert Products and the Products so Produced", U.S. Patent Application No. 09/296,706; Filed Apr. 21, 1999; (Docket No. C944:3604), 5 pages.

Copy of AResponse to Office action filed aug. 16, 2000, in response to Office action date Geb. 16, 2000, Hashisaka, a., et al., "Method for Reducing Color Migration in Multi–Layered, Caramel Colored, Gel–Based Dessert Products and the Products so Produced", U.S. Patent Application No. 09/296, 706; Filed Apr. 21, 1999; (Docket No. C944:3604), 7 pages.

* cited by examiner

COCOA POWDER FOR USE IN MULTI-LAYERED GEL-BASED DESSERT PRODUCTS AND METHOD FOR MAKING SAME

BACKGROUND OF THE INVENTION

1. Field of the Invention

This invention relates to the food-making arts. In particular, it relates to an improved cocoa powder for use in multi-layered, gel-based dessert products, such as puddings, a method for making the improved cocoa powder, and the gel-based dessert products containing the cocoa powder.

2. Discussion of the Related Art

Consumers regularly eat pudding and other gel-based dessert products, some of which are non-dairy based. One of the most popular flavors for such products is chocolate and, consequently, one of the most important ingredients is cocoa powder. Cocoa powder contains a relatively high percentage, ca. 5%, flavonoids. It is believed that during the preparation of cocoa powder from cocoa beans some of the flavonoids undergo polymerization reactions resulting in the formation of tannins. The flavonoids and tannins are the pigment species that give cocoa powder its unique, rich, brown color.

Consumers' desire for convenient foods led to the development of chocolate puddings and other gel-based dessert products that require little or no advance preparation by the consumer before eating. Beginning approximately 30 years ago, consumers were offered these types of products in ready-to-eat, single-serve, portable containers. Initially these products were sold as shelf-stable, canned products. These canned products, such as pudding, were subjected to retort processing and did not as closely approximate the later developed aseptically packaged puddings.

As consumers begin to have more choices with regard to wholesome, nutritious snacks, manufacturers have developed new markets and are innovative to remain competitive in this area. A new market for pudding and other dessert gels is the entry into the refrigerated section of the supermarket. One of the innovations has been the packaging changeover from metal cans to opaque plastic cups and then to clear plastic cups, allowing the consumer to see that which is being purchased. Industry's move to clear plastic cups has engendered other innovations, such as the layering of different flavor puddings or other gelled desserts into the same cup or container. These improvements also are being used with shelf-stable puddings and gel-based desserts that are stored at room temperature for long periods of time.

The color of a pudding and other gel-based dessert product is one of the first attributes recognized by the senses of the purchaser and intended consumer of the product. Typically, when a manufacturer makes pudding, or other dessert product which has more than one flavor layer, the manufacturer colors the layers differently to make the product more attractive and commercially appealing. For example, manufacturers have tried to produce pudding products having a chocolate-flavored base that is dark brown in color next to a topping having a different flavor and a contrasting color, such as tan, caramel, yellow or white.

Color migration can be defined as the mobility of a pigment or other colorant in a pudding formulation into an adjacent layer of pudding, that it was not intended to be in, that results in the lightening or darkening or otherwise distorting the adjacent layer(s) during the shelf-life of the pudding product. In a single flavor/color pudding cup, the migration of color is not a problem. However, in a multi-layered pudding cup, the migration of the color changes the appearance of the product from what it was intended to be, which results in the product not appearing as it was originally designed to appear to the consumers, and thus having a decreased consumer acceptance. For example, when the bottom layer is a dark brown, cocoa-flavored layer and the top layer is a lighter caramel color, the dark-brown cocoa powder pigment can migrate from the bottom layer up into the upper lighter caramel layer causing the caramel layer to darken.

Thus, there has existed a definite need for a modified cocoa powder that does not migrate between differently colored layers of a multi-layered, gel-based dessert product. There has existed a further need for a simple and inexpensive method for preparing such modified cocoa powders and multi-layered dessert products containing such powders. This present invention satisfies these and other needs.

SUMMARY OF THE INVENTION

Now in accordance with the invention, there has been found an improved, modified cocoa powder and a method for modifying cocoa powder that initially contains water-soluble solids. The modified cocoa powder is prepared by a method that includes the steps of extracting one part by weight unmodified cocoa powder starting material with at least one part by weight water, typically from about 5 to about 30 parts by weight water, at a temperature and for a time sufficient to extract a substantial portion of the water-soluble solids. In some embodiments, the water has a pH in the range of from about 2 to about 8 and in some embodiments the pH is in the range of from about 2 to about 5. Generally, the extraction level is from about 5 to about 60% and, in some embodiments, from about 10 to about 30%.

The resulting water-soluble solids-containing supernatant is then separated from the water-extracted cocoa powder. Suitable methods for separation include centrifugal separation, membrane separation and a combination thereof. A preferred method of separation is centrifugal separation, with a centrifugal force of from about 20,000 to about 30,000 Z being most preferred. In some embodiments, the extraction and separation steps are then repeated and, in some embodiments, the water-extracted cocoa powder is dried to a moisture content of about 5 wt. % or less, after the final separation of the supernatant.

The resulting, water-extracted cocoa powder is particularly useful in preparing multi-layered, gel-based dessert products, such as puddings, yogurts, and non-milk gel-based desert products, having a first gel-based layer and an adjacent second gel-based layer, at least one of the layers containing, from about 1 wt. % to about 10 wt. % and in some embodiments from about 2 wt, % to about 5 wt. %, of the water-extracted cocoa powder. The water-extracted cocoa powder-containing layer typically has a total solids content of from about 5 wt. % to about 70 wt. %, more preferably from about 20 wt. % to about 50 wt. % and up to about 15 wt. % protein, more preferably from about 1 wt. % to about 5 wt. % protein.

The water-extracted cocoa powder-containing layer and, preferably, all the layers, typically also contain from about 30 to about 70 wt. % skim milk, non-fat milk or mixtures thereof; from about 5 to about 20 wt. % water; a sweetener, such as sucrose, dextrose, fructose, corn syrup, corn syrup solids, high fructose corn syrups, saccharin, aspartame, Sucralose™, Acesulfame K™, or mixtures thereof; a starch, such as modified or unmodified corn starch, potato starch, tapioca starch, rye flour, wheat flour; a hydrocolloid gum; and a fat. In some embodiments the water-extracted cocoa powder-containing layer and, preferably, all the layers contain up to about 30 wt. % sucrose, preferably from about 10 to about 20 wt. % sucrose; up to about 20 wt. % starch, preferably from about 2 to about 10 wt. % starch; up to about 4 wt. % hydrocolloid gum, preferably from about 0.05 to about 2 wt. % hydrocolloid gum; and up to about 20 wt. % fat, preferably from about 0.5 to about 10 wt. % fat.

DETAILED DESCRIPTION OF THE PREFERRED EMBODIMENTS

The cocoa powder in accordance with the invention is made by modifying any commercially available cocoa powder. Suitable cocoa powder starting materials include alkalized or non-alkalized cocoa powders, such as the cocoa powders available from DeZaan, Inc., Stamford, Conn., E D&F Man Cocoa Products, Glassboro, N.J., and W.L.M. Bensdorp Co., Westborough, Mass. Preferably the starting material has a total solids content in excess of about 93%.

The cocoa color produced by cocoa powder is a function of a variety of pigments having a wide range of solubility in water. The insoluble pigments cannot effectively migrate throughout the pudding, while the soluble pigments are readily diffused. Accordingly, in a first step of the inventive method, water is added to the cocoa powder to extract a substantial portion of the water-soluble pigments. By water is meant tap water, distilled water, deionized water or any aqueous solution that will not adversely affect the extracted cocoa powder. For example, food acceptable acids or bases can be added to the water, to modify the pH as desired.

The amount of water and the temperature of the water used for extraction vary over a wide range of suitable conditions and can be selected by one-skilled in the art without undue experimentation. The conditions are chosen so that a substantial portion of the water-soluble pigments are extracted. Typically, the initial temperature of the water and the temperature at which the extraction then occurs is in the range of from about 0° C. to about 100° C. In some embodiments, the pH of the water is adjusted to from about 2 to about 8, preferably from about 5 to about 8.

Preferably, at least one part water, more preferably from about five to about thirty parts water, by weight, is added to about one part by weight cocoa powder. The mixture is then agitated for from about five minutes to about 20 minutes until a substantial portion of the water-soluble pigments are extracted.

In some embodiments, the cocoa powder is extracted by way of more than one batch extraction using the same or different conditions for each extraction. In other embodiments, the extraction can be continuous.

The supernatant is then separated from the resulting water-extracted cocoa powder, using any suitable technique. Representative techniques include membrane separation methods, such as continuous or discontinuous vacuum-filtration or ultrafiltration or a combination of these methods. In preferred embodiments, the supernatant is removed from the water-extracted cocoa powder by centrifugation, for example by centrifuging at temperature in the range of from about 20° C. to about 40° C. for from about 20 minutes to about 30 minutes under a centrifugal force of from about 20,000 Z to about 32,000 Z.

The portion of water-soluble species extracted from the cocoa powder starting material is characterized by an extraction level, defined as:

$$\text{extraction level} = \frac{\text{amount of total solids extracted}}{\text{amount of total solids in cocoa powder starting material}} \times 100$$

where the "amount of total solids extracted" represents the weight of the total dry-matter removed within the supernatant.

The extraction level is preferably at least about 15 and more preferably at least about 20. The extraction level increases with the number of extractions and with the total amount of water used. The extraction level also increases with increasing temperature.

The water-extracted cocoa powder in accordance with the invention is of use in the chocolate-flavored layer of multi-layered pudding, although it is also of use in other gel-based dessert products including both other milk-based gel products, such as yogurt, as well as their non-dairy counterparts. The multi-layered dessert products made in accordance with this invention have at least two adjacent layers. In preferred embodiments, each layer has a total solids content of from about 5 to about 70 wt. %, more preferably from about 20 to about 50 wt. %. The composition of representative milk-based gel products is as follows:

TABLE 1

| Ingredient | Preferred Range (% weight) | Most Preferred Range (% weight) |
| --- | --- | --- |
| Protein | 0–15 | 1–5 |
| Sweetener | 0–30 | 10–20 |
| Starch | 0–20 | 2–10 |
| Gum | 0–4 | 0.05–2 |
| Fat | 0–20 | 0.5–10 |
| Cocoa Powder | 1–10 | 2–5 |
| Total Solids | 5–70 | 20–50 |

Each layer is prepared from conventional pudding ingredients, typically including nonfat milk, water, a sweetener, a fat, a thickener, particularly a starch thickener, and at least one emulsifier/stabilizer. Additional ingredients include non-fat milk solids, pieces of fruit, salt, colorants, and flavorants.

Each layer typically contains up to about 15 wt. % protein, preferably from about 1 to about 5 wt. % protein. Relatively high protein concentrations further help to prevent the migration of colors between adjacent pudding layers. In preferred embodiments, the protein content is provided by dairy solids. Such embodiments can be made with from about 30 to about 70 wt. %, preferably from about 35 to about 45 wt. %, skim milk and/or non-fat milk, and from about 5 to about 20 wt. %, preferably from about 10 to about 15 wt. %, water. Throughout the specification and claims, weight percentages are based on the total weight of the ingredients used to make the pudding layer, unless clearly indicated otherwise.

The sweetener component employed in formulating the pudding layers of the present invention is chosen to provide a desired degree of sweetness and solids to the final pudding product. Relatively high sugar concentrations also help to prevent the migration of colors between adjacent pudding layers. Sucrose is the preferred sweetener component. Generally, sucrose is used in an amount up to about 30 wt. %, preferably from about 10 to about 20 wt. %. Other suitable sweeteners that can be employed as all or a portion of the sweetener component include other sweet mono-, di- or polysaccharides, such as dextrose, fructose, corn syrups, corn syrup solids, high fructose corn syrups, and the like. Nutritive and non-nutritive, intensive sweeteners such as saccharin, aspartame, Sucralose™, Acesulfame K™ and the like may also be employed as all or part of the sweetener component. The use of intensive sweeteners may be accompanied by use of suitable sweet or non-sweet bulking agents to provide a desired solids level; however, bulking agents will typically not be needed. All of theses components are to be included in the term "sweetener" as employed in this invention; provided, however, that in the case of syrups, only the solids portion is included as a sweetener.

Any suitable thickening agent can be employed to provide the desired firmness or texture. In preferred embodiments, the thickening agent is a starch, including corn starch, potato starch, tapioca starch, rye flour, wheat flour, and the like, modified or unmodified. Typically, the starch is present in an amount up to about 20 wt. %, preferably from about 2 to about 10 wt. %.

The pudding layers can also contain a hydrocolloid gum to further assist in the prevention of color migration between adjacent layers. Suitable hydrocolloid gums include xanthan, guar, gellan, carboxymethylcellulose, methyl cellulose, and carrageenan. The hydrocolloid gum is typically added in an amount up to about 4 wt. %, preferably from about 0.05 to about 2 wt. %.

To improve the textual quality and mouthfeel of the pudding, the layers typically contain up to about 20 wt. % fat, preferably from about 0.5 to about 10 wt. % fat. The fat is generally provided in the form of a fat emulsion and/or oil, usually as a fat emulsion containing a vegetable fat, such as a partially hydrolyzed vegetable oil.

The pudding layers also contain at least one emulsifier/stabilizer component which aids in dispersing and mixing of ingredients and contributes to the desired firm, smooth texture. A preferred emulsifier/stabilizer is sodium stearoyl-2-lactylate. Other suitable emulsifier/stabilizer ingredients include mixtures of mono- and di- glycerides prepared by direct esterfication of edible fatty acids and glycerine, propylene glycol esters of fatty acids, and lecithin. The emulsifier/stabilizer(s) is generally present in an amount from about 0.01 to about 2 wt. %, preferably from about 0.05 to about 1.5 wt. %.

Salt, typically in an amount from about 0.05 to about 2 wt. %, preferably from about 0.75 to about 1.25 wt. %, can also be included in the pudding layers. Other ingredients that can be included in one or more of the layers include non-fat milk solids and pieces of fruit.

At least one of the pudding layers is a brown, chocolate-flavored layer containing the water-extracted cocoa powder in accordance with the invention. The amount of water-extracted cocoa powder depends on the particular taste and color desired. The amount to be used in a formulation for a particular pudding layer will readily be determinable by one skilled in the art without undue experimentation. Typically, the amount of the water-extracted cocoa powder is from about 1 to about 10 wt. %, preferably from about 2 to about 5 wt. %.

Without wishing to be bound by a theory of the invention, it is believed that the extraction removes a substantial portion of the small, water-soluble cocoa pigments initially present in the cocoa powder. The remaining large cocoa pigments effectively do not migrate from the cocoa-colored layer to the adjacent layers under the storage conditions typically encountered by refrigerated or shelf-stable pudding products, ie., temperatures in the range of from about 5° C. to about 25° C., for periods as great as four months or longer.

If desired, the cocoa-colored layer can also contain additional colorants, such as alumina-based oil-dispersable lake colorants. The cocoa-colored layer can also contain additional flavorants, including additional cocoa flavorants or different flavorants, such as vanilla, fruit, caramel, baked, dessert, or savory flavorants.

The layer(s) adjacent the cocoa-colored layer typically contains a colorant. Suitable colorants include alumina-based oil-dispersable lakes comprised of a mixture of FD&C dyes. The adjacent layer(s) can also contain flavorants, as for example vanilla, strawberry, caramel, and the like. The flavorants can be used at any desired concentration depending upon the particular flavoring desired. Typically, the flavorants are present in an amount from about 0.05 to about 2 wt. %, preferably from about 0.1 to about 1.5 wt. %.

It is preferable that all the layers have a similar composition and a similar total-solids level, so that the levels have substantially the same osmotic pressure. Eliminating a difference in osmotic pressure between adjacent levels helps to prevent color migration between the layers.

A typical pudding formulation is given in the table below. Certain ingredients will not be present in certain types of pudding such as the intentional absence of fat or oil in "fat free" pudding. Similarly, not all gel desserts (i.e., "non-dairy") need contain milk products.

TABLE 2

| Ingredient | Preferred Range (% weight) | Most Preferred Range (% weight) |
|---|---|---|
| Nonfat Milk | 30.0–70 | 35.0–45 |
| Water | 5.00–20 | 10.0–15 |
| Sweetener | 0.05–30 | 0.50–25 |
| Fat | 0.50–15 | 0.50–10 |
| Thickener | 2.00–10 | 3.00–8.0 |
| Salt | 0.05–2.0 | 0.75–1.25 |
| Emulsifier/Stabilizer | 0.01–2.0 | 0.05–1.50 |
| Water-extracted Cocoa Powder | 1–10 | 2–5 |
| Other Colorants | 0.01–2.0 | 0.02–1.25 |
| Flavorants | 0.05–2.0 | 0.10–1.50 |

According to one method for preparing the multi-layer pudding in accordance with the invention, a pudding base-layer is prepared first by combining the liquid ingredients, including a portion of the water having a temperature of between about 65° C. and about 80° C., preferably about 75° C.; with from about 30 to about 70 wt. %, preferably from about 35 to about 45 wt. % heated skim milk and/or non-fat milk; from about 0.5 to about 15 wt. %, preferably from about 0.5 to about 10 wt. %. vegetable oil; and from about 0.01 to about 2 wt. %, preferably from about 0.05 to about 1.5 wt. %. emulsifier/stabilizer(s). If the bottom layer is to contain the water-extracted cocoa powder, from about 1 to about 10 wt. %, preferably from about 2 to about 5 wt. % can be added at this time. Alternatively, the water-extracted cocoa powder can be added at any time during the process, up until the ingredients are cooked and the gel is formed. If the base is to contain a colorant other than the water-extracted cocoa powder or in addition to the water-extracted cocoa powder, it can be combined with the other liquid ingredients or added subsequently.

The liquid ingredients are then mixed to effect thorough and complete dispersion, such as by homogenization. Typically, the liquid ingredients are charged into a single or multiple-stage homogenizers at an elevated temperature. The mixture is then passed through the homogenizer at a sufficient temperature and pressure to form a homogenized base.

To the homogenized base are added the remaining ingredients including from about 2 to about 10 wt. %, preferably from about 3 to about 8 wt. %. starch, added as a slurry using the remaining portion of water (the total amount of water added in both portions is from about 5 to about 20 wt. %, preferably from about 10 to about 15 wt. %); and other dry ingredients, such as salt in an amount from about 0.05 to about 2 wt. %, preferably from about 0.75 to about 1.25 wt. %, and flavorants, in an amount from about 0.05 to about 2 wt. %, preferably from about 0.1 to about 1.5 wt. %. If the colorants were not incorporated into the homogenized base, they can be added at this time.

These remaining ingredients are added to the homogenized base using a relatively high level of agitation. An induction mixer is one type of device for providing the desired agitation. After thorough mixing, the mixture is thermally processed, for example in a tube or a scraped-surface heat exchange apparatus so as to best accommodate the increasing viscosity of the mixture during heating. The pudding mixture then is heated to a sufficient temperature for the necessary time required for effective cooking and microbial kill.

The resulting pudding is cooled to a temperature suitable for filling into a transparent container, such as a transparent cup. Cooling may be accomplished using tubular and/or scraped-surface heat exchanger. The cooled pudding is then introduced into the cup to form the base-layer.

A similar process is used to prepare a pudding topping layer having a different color. After cooling to a suitable temperature for filling, the topping layer is introduced into the transparent plastic cup to form a second layer on top of the first. The process can be repeated as many times as desired to form three or more different layers. The third layer, for example, can be made from a third pudding formulation or it can be made from the material used to form the bottom layer.

After the transparent cup is filled, it is sealed, for example, with an adhesively applied foil lid. If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials, i.e., the transparent container and foil lid. These steps would also be desirable to reduce microbial activity even in the event that a true aseptic process is not being sought, such as when the pudding is placed in a refrigerated distribution system and sterility is not required but extended storage life is desirable.

While the invention has been described in detail with reference to certain preferred embodiments thereof, it will be understood that modifications and variations are within the spirit and scope of that which is described and claimed.

We claim:

1. A method for modifying cocoa powder containing water-soluble solids comprising the steps of:
   (a) contacting one part by weight cocoa powder containing water-soluble solids with at least one part by weight water at a pH ranging from about 2 to about 5 and at a temperature and for a time sufficient to extract a substantial portion of the water-soluble solids from the cocoa powder; and then
   (b) separating the resulting water-soluble solids-containing supernatant from the thus water-extracted cocoa powder to produce a modified cocoa powder.

2. The method in accordance with claim 1, wherein the extraction level is from about 5 to about 60.

3. The method in accordance with claim 1, wherein the extraction level is from about 10 to about 30.

4. The method in accordance with claim 1, wherein the cocoa powder is extracted with from about 5 to about 30 parts by weight water.

5. The method in accordance with claim 1, wherein the supernatant is separated using centrifugal separation, membrane separation or a combination thereof.

6. The method in accordance with claim 1, wherein the supernatant is separated using centrifugal separation.

7. The method in accordance with claim 6 wherein the centrifugal separation employs a centrifugal force of from about 20,000 to about 30,000 Z.

8. The method in accordance with claim 1, further comprising repeating step (a) then step (b).

9. The method in accordance with claim 1, further comprising the step of:
   (c) drying the water-extracted cocoa powder to a moisture content of 5 wt. % or less, after separation of the supernatant.

10. A method for modifying cocoa powder containing water-soluble solids comprising the steps of:
    (a) contacting one part by weight cocoa powder containing water-soluble solids with from about 5 to about 30 parts by weight water at a pH of from about 2 to about 5 and at a temperature and for a time sufficient to result in an extraction level of from about 5 to about 60 from the cocoa powder; and then
    (b) separating the resulting water-soluble solids-containing supernatant from the thus water-extracted cocoa powder using centrifugal separation, membrane separation or a combination thereof to produce a modified cocoa powder.

11. The method in accordance with claim 10, wherein the extraction level is from about 10 to about 30.

12. The method in accordance with claim 10, wherein the supernatant is separated using centrifugal separation.

13. The method in accordance with claim 12, wherein the centrifugal separation employs a centrifugal force of from about 20,000 to about 30,000 Z.

14. The method in accordance with claim 10, further comprising repeating both step (a) then step (b).

15. The method in accordance with claim 10, further comprising the step of:
    (c) drying the water-extracted cocoa powder to a moisture content of 5 wt. % or less, after separation of the supernatant.

16. A method for making a multi-layered food product comprising:
    preparing a modified cocoa powder by contacting one part by weight cocoa powder containing water-soluble solids with at least one part by weight water at a temperature and for a time sufficient to extract a substantial portion of the water-soluble solids from the cocoa powder; and then separating the resulting water-soluble solids-containing supernatant from the thus water-extracted cocoa powder to produce a modified cocoa powder;
    preparing a first mixture containing the modified cocoa powder and having a first color;
    introducing the first mixture into a container; and
    introducing into the container a second mixture having a second color different from the first color, wherein the second mixture is adjacent to the first mixture.

17. The method in accordance with claim 16, wherein the first mixture comprises milk.

18. The method in accordance with claim 16, wherein the second mixture comprises milk.

19. The method in accordance with claim 16, wherein the second mixture comprises a modified cocoa powder prepared by contacting one part by weight cocoa powder containing water-soluble solids with at least one part by weight water at a temperature and for a time sufficient to extract a substantial portion of the water-soluble solids from the cocoa powder; and then separating the resulting water-soluble solids-containing supernatant from the thus water-extracted cocoa powder to produce a modified cocoa powder.

20. The method in accordance with claim 16, wherein the first and second mixtures comprise pudding.

21. The method in accordance with claim 16, wherein the first and second mixtures comprise yogurt.

22. The method in accordance with claim 16, wherein the first mixture is introduced into the container before the second mixture.

23. The method in accordance with claim 16, wherein the first mixture is introduced on top of the second mixture in the container.

24. The method in accordance with claim 16, wherein the second mixture is introduced on top of the first mixture in the container.

25. The method in accordance with claim 16, wherein the extraction level is from about 5 to about 60.

26. The method in accordance with claim 16, wherein the extraction level is from about 10 to about 30.

27. The method in accordance with claim 16, wherein the cocoa powder is extracted with from about 5 to about 30 parts by weight water.

28. The method in accordance with claim 16, wherein the cocoa powder is extracted at a pH of from about 2 to about 8.

29. The method in accordance with claim 16, further comprising contacting the modified cocoa powder with water at a temperature and for a time sufficient to extract additional water-soluble solids from the modified cocoa powder; and then separating the resulting water-soluble solids-containing supernatant from the thus water-extracted modified cocoa powder to produce a further modified cocoa powder, wherein the further modified cocoa powder is included in the first mixture.

30. The method in accordance with claim 16, wherein the step of preparing the cocoa powder further comprises the step of drying the water-extracted cocoa powder to a moisture content of 5 wt. % or less, after separation of the supernatant.

31. The method in accordance with claim 16, wherein the water-extracted cocoa powder is present in the first layer in an amount from about 1 wt. % to about 10 wt %.

32. The method in accordance with claim 16, wherein the water-extracted cocoa powder is present in the first layer in an amount from about 2 wt. % to about 5 wt %.

33. The method in accordance with claim 16, wherein the first layer has a total solids content ranging from about 5 wt. % to about 70 wt. %.

34. The method in accordance with claim 16, wherein the first layer has a total solids content ranging from about 20 wt. % to about 50 wt. %.

35. The method in accordance with claim 16, wherein the first layer contains up to about 15 wt. % protein.

36. The method in accordance with claim 16, wherein the first layer contains from about 1 to about 5 wt. % protein.

37. The method in accordance with claim 16, wherein the first layer contains at least one additional ingredient selected from the group consisting of sucrose, dextrose, fructose, corn syrup, corn syrup solids, high fructose corn syrup, saccharin, aspartame, Sucralose, Acesulfame K, and mixtures thereof.

38. The method in accordance with claim 16, wherein the first layer contains up to about 30 wt. % sucrose.

39. The method in accordance with claim 16, wherein the first layer contains from about 10 to about 20 wt. % sucrose.

40. The method in accordance with claim 16, wherein the first layer contains up to about 20 wt. % of a thickening agent selected from the group consisting of corn starch, potato starch, tapioca starch, rye flour, wheat flour, and mixtures thereof.

41. The method in accordance with claim 40, wherein the thickening agent is present in the first layer in an amount ranging from about 2 to about 10 wt. %.

42. The method in accordance with claim 16, wherein the first layer contains up to about 4 wt. % of a hydrocolloid gum.

43. The method in accordance with claim 42, wherein the hydrocolloid gum is present in the first layer in an amount ranging from about 0.05 to about 2 wt. %.

44. The method in accordance with claim 16, wherein the first layer contains up to about 20 wt. % fat.

45. The method in accordance with claim 44, wherein the fat is present in the first layer in an amount ranging from about 0.5 to about 10 wt. %.

46. The method in accordance with claim 16, wherein the first layer and second layer each have a total solids content ranging from about 5 wt. % to about 70 wt. % and each comprises:

from about 30 to about 70 wt. % skim milk, non-fat milk, or mixture thereof, from about 5 to about 20 wt. % water;

from about 0.05 to about 30 wt. % sucrose;

from about 2 wt. % to about 10 wt. % starch;

from about 0.5 to about 10 wt. % fat; and from about 0.05 to about 2 wt. % of a hydrocolloid gum.

47. The method in accordance with claim 46, wherein the modified cocoa powder is present in the first layer in an amount ranging from 1 wt. % to about 10 wt. %.

48. The method in accordance with claim 47, wherein the modified cocoa powder is present in the second layer in an amount ranging from 1 wt. % to about 10 wt. %.

49. The method in accordance with claim 16, wherein the first mixture is non-dairy based.

50. The method in accordance with claim 16, wherein the first mixture is gel-based.

51. The method in accordance with claim 16, wherein the first mixture is starch-based.

52. A method for making a multi-layered food product comprising:

preparing a modified cocoa powder by contacting cocoa powder containing water-soluble solids with water at a temperature and for a time sufficient to extract water-soluble solids from the cocoa powder; and then separating the resulting water-soluble solids-containing supernatant from the thus water-extracted cocoa powder to produce a modified cocoa powder;

preparing a first mixture containing the modified cocoa powder and having a first color;

introducing the first mixture into a container; and introducing into the container a second mixture having a second color different from the first color, wherein the second mixture is adjacent to the first mixture.

53. The method in accordance with claim 52, wherein the first mixture comprises milk.

54. The method in accordance with claim 52, wherein the second mixture comprises milk.

55. The method in accordance with claim 52, wherein the second mixture comprises a modified cocoa powder prepared by contacting cocoa powder containing water-soluble solids with water at a temperature and for a time sufficient to extract water-soluble solids from the cocoa powder; and then separating the resulting water-soluble solids-containing supernatant from the thus water-extracted cocoa powder to produce a modified cocoa powder.

56. The method in accordance with claim 52, wherein the first and second mixtures comprise pudding.

57. The method in accordance with claim 52, wherein the first and second mixtures comprise yogurt.

58. The method in accordance with claim 52, wherein the first mixture is introduced into the container before the second mixture.

59. The method in accordance with claim 52, wherein the first mixture is introduced on top of the second mixture in the container.

60. The method in accordance with claim 52, wherein the extraction level is from about 5 to about 60.

61. The method in accordance with claim 52, wherein the water-extracted cocoa powder is present in the first layer in an amount from about 1 wt. % to about 10 wt %.

62. The method in accordance with claim 52, wherein the first layer has a total solids content ranging from about 20 wt. % to about 50 wt. %.

63. The method in accordance with claim 52, wherein the first layer contains at least one additional ingredient selected from the group consisting of sucrose, dextrose, fructose, corn syrup, corn syrup solids, high fructose corn syrup, saccharin, aspartame, Sucralose, Acesulfame K, and mixtures thereof.

64. The method in accordance with claim 52, wherein the first layer contains up to about 30 wt. % sucrose.

65. The method in accordance with claim 52, wherein the first layer and second layer each have a total solids content ranging from about 5 wt. % to about 70 wt. % and each comprises:

from about 30 to about 70 wt. % skim milk, non-fat milk, or mixture thereof;

from about 5 to about 20 wt. % water;

from about 0.05 to about 30 wt. % sucrose;

from about 2 wt. % to about 10 wt. % starch;

from about 0.5 to about 10 wt. % fat; and from about 0.05 to about 2 wt. % of a hydrocolloid gum.

66. A method for making a multi-layered food product comprising:

preparing a modified cocoa powder by extracting water-soluble solids from cocoa powder to produce a modified cocoa powder containing a reduced amount of water-soluble solids relative to the amount of water-soluble solids present in the cocoa powder prior to extraction;

preparing a first mixture containing the modified cocoa powder and having a first color;

introducing the first mixture into a container; and introducing into the container a second mixture having a second color different from the first color, wherein the second mixture is adjacent to the first mixture.

67. The method in accordance with claim 66, wherein the first mixture comprises milk.

68. The method in accordance with claim 66, wherein the second mixture comprises milk.

69. The method in accordance with claim 66, wherein the second mixture comprises a modified cocoa powder prepared by extracting water-soluble solids from cocoa powder to produce a modified cocoa powder containing a reduced amount of water-soluble solids relative to the amount of water-soluble solids present in the cocoa powder prior to extraction.

70. The method in accordance with claim 66, wherein the first and second mixtures comprise pudding.

71. The method in accordance with claim 66, wherein the first and second mixtures comprise yogurt.

72. The method in accordance with claim 66, wherein the water-extracted cocoa powder is present in the first layer in an amount from about 1 wt. % to about 10 wt %.

73. The method in accordance with claim 66, wherein the first layer contains at least one additional ingredient selected from the group consisting of sucrose, dextrose, fructose, corn syrup, corn syrup solids, high fructose corn syrup, saccharin, aspartame, Sucralose, Acesulfame K, and mixtures thereof.

74. The method in accordance with claim 66, wherein the first layer contains up to about 30 wt. % sucrose.

75. The method in accordance with claim 66, wherein the first layer and second layer each have a total solids content ranging from about 5 wt. % to about 70 wt. % and each comprises:

from about 30 to about 70 wt. % skim milk, non-fat milk, or mixture thereof;

from about 5 to about 20 wt. % water;

from about 0.05 to about 30 wt. % sucrose;

from about 2 wt. % to about 10 wt. % starch;

from about 0.5 to about 10 wt. % fat; and from about 0.05 to about 2 wt. % of a hydrocolloid gum.

\* \* \* \* \*